United States Patent [19]
Strasser et al.

[11] Patent Number: 5,208,882
[45] Date of Patent: May 4, 1993

[54] HYBRID THIN FILM OPTICAL WAVEGUIDE STRUCTURE HAVING A GRATING COUPLER AND A TAPERED WAVEGUIDE FILM

[75] Inventors: Thomas A. Strasser; Wei Y. Hsu, both of Ithaca; Mool C. Gupta, Webster, all of N.Y.

[73] Assignee: Eastman Kodak Company, Rochester, N.Y.

[21] Appl. No.: 791,830

[22] Filed: Nov. 14, 1991

[51] Int. Cl.$^5$ ............................................. G02B 6/34
[52] U.S. Cl. ...................................... 385/37; 385/43; 385/130
[58] Field of Search .................... 385/37, 43, 129, 130

[56] References Cited

U.S. PATENT DOCUMENTS

| | | | |
|---|---|---|---|
| 4,097,117 | 6/1978 | Neil et al. | 385/37 |
| 4,531,809 | 7/1985 | Carter et al. | 385/129 |
| 4,634,215 | 1/1987 | Reule | 385/37 |
| 5,058,977 | 10/1991 | Sorin | 385/30 |

Primary Examiner—Frank Gonzalez
Attorney, Agent, or Firm—William W. Holloway

[57] ABSTRACT

A hybrid, thin-film, optical waveguide structure has a substrate with a grating coupler formed thereon. A thin-film waveguide film is formed on the substrate and has a tapered portion overlaying the grating.

22 Claims, 12 Drawing Sheets

HYBRID THIN FILM OPTICAL WAVEGUIDE STRUCTURE HAVING A GRATING COUPLER AND A TAPERED WAVEGUIDE FILM

TECHNICAL FIELD

This invention pertains generally to optical waveguides, and, more particularly, to a waveguide structure incorporating a grating coupler.

BACKGROUND OF THE INVENTION

Efficient coupling of a light source into a thin film optical waveguide is a problem for integrated optics devices. The difficulty is maintaining efficient coupling of the light into the waveguide with minimal alignment difficulties. Grating couplers and taper couplers have been utilized for this purpose. Prior grating couplers utilized a grating depth variation to increase the theoretical coupling efficiency.

A grating coupler couples the light by diffracting an incident beam off a grating on the surface of the waveguide either into or out of the planar waveguide, depending on whether it is used as an input or an output coupler. The main disadvantage of the grating coupler is that efficient coupling is obtained only over a narrow range of wavelength and/or incidence angles. In current optical diode laser applications, it is difficult to use grating couplers because of beam divergence and wavelength instability. Accordingly, it will be appreciated that it would be highly desirable to have an optical diode laser structure wherein it is easy to use grating couplers, and wherein the difficulties with beam divergence and wavelength instability are eliminated.

A taper coupler couples the light either into or out of the film by total internal reflection of the beam off of a taper in the film waveguide. The reflection of a propagating beam in the taper changes the propagation angle in the waveguide, either changing an input beam toward the mode propagation angle within the waveguide, or changing a mode propagating in the waveguide. The mode propagating in the waveguide is changed to an angle less than that for total internal reflection at the waveguide/substrate interface, and the beam is then outcoupled into the substrate. A characteristic of this coupler is that the beam outcoupled from the waveguide is spread over a wide angular range of 10° or more, compared to the grating input coupler which is spread over an angular range of 1° or less. The main problem for input coupling is mode matching, which is very difficult to achieve due to a complex relationship between beam divergence and the intensity distribution. A difficulty for output coupling is that the outcoupled beam cannot be collimated or imaged clearly, therefore, it is difficult to utilize the beam for functions other than simple intensity detection. Accordingly, it will be appreciated that it would be highly desirable to have a structure wherein mode matching can be achieved and the outcoupled beam can be collimated or imaged clearly.

SUMMARY OF THE INVENTION

The present invention is directed to overcoming one or more of the problems set forth above. Briefly summarized, according to one aspect of the present invention, a hybrid optical waveguide structure comprises a substrate having a grating formed thereon, and a thin-film waveguide film formed on the substrate and having a tapered portion overlaying the grating.

The combination of a grating with a tapered film yields a hybrid coupler that couples light efficiently, with an incidence angle or wavelength acceptance that is altered by the taper structure.

A tapered waveguide film is deposited on a substrate with a grating structure resulting in a hybrid thin film waveguide coupler designed for a broader or narrower acceptance for wavelength or incidence angle. The couplers are as efficient as traditional grating couplers but with much broader acceptance. The maximum broadening is a coupling full-width-half-maximum (FWHM) of 2° (or 12 nm). This is several times the acceptance of an untapered structure.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
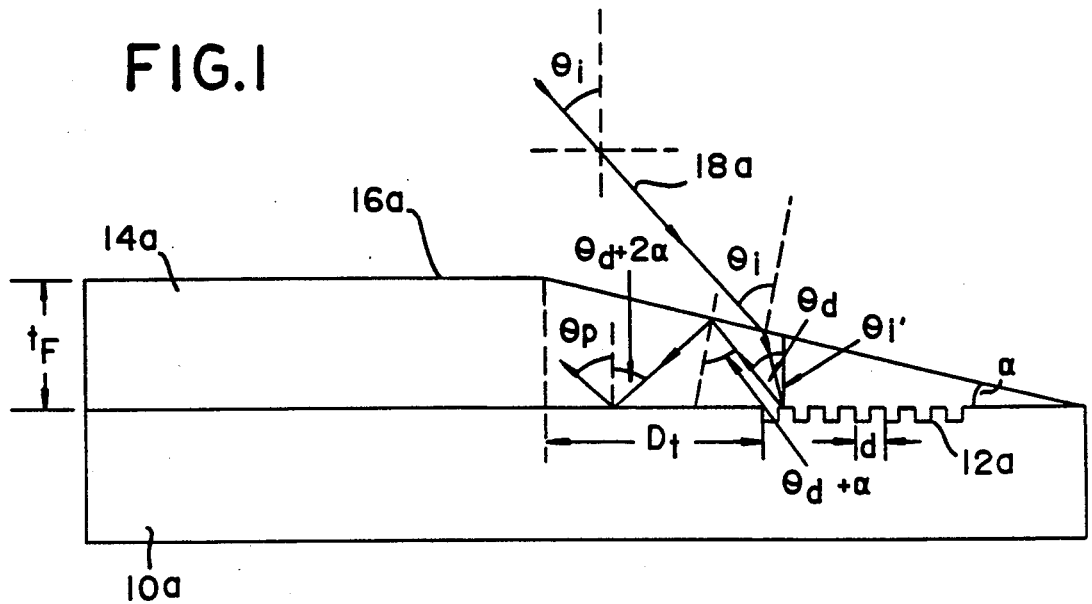
FIG. 1 is a diagrammatic sectional view of a preferred embodiment of an optical waveguide structure constructed according to the present invention utilizing a hybrid grating to tapered film coupler for broadening the acceptance of the grating coupler.
Figure 2:
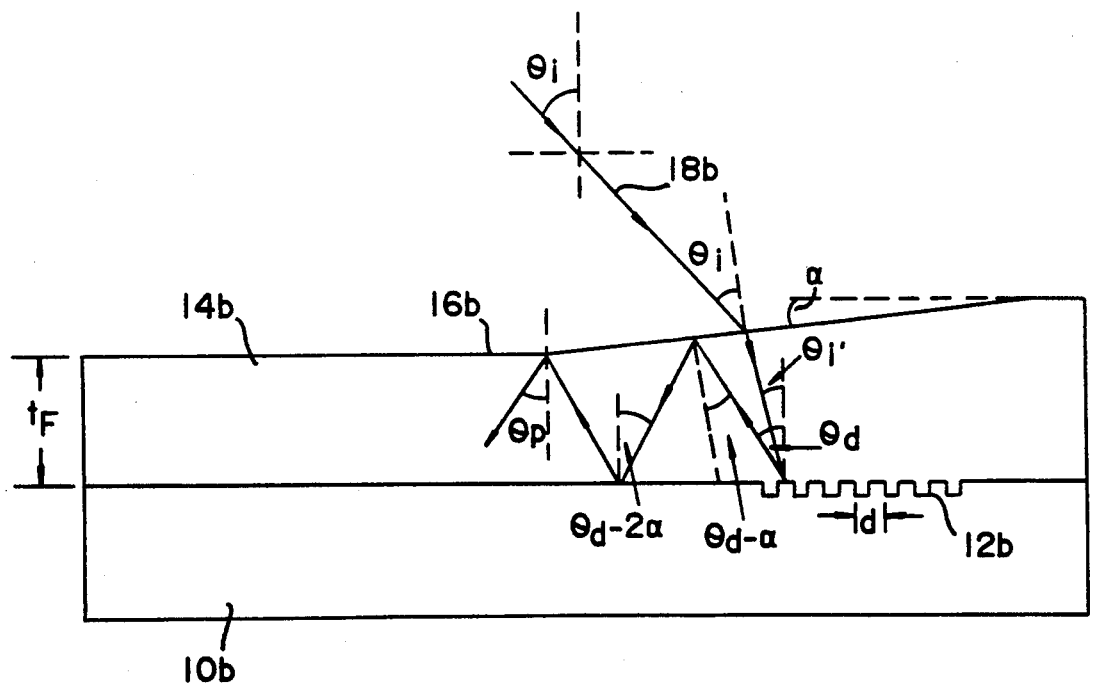
FIG. 2 is a diagrammatic sectional view of another preferred embodiment of an optical waveguide structure similar to FIG. 1, but illustrating a hybrid grating to tapered film coupler for narrowing the acceptance of the grating coupler.

Referring now to the drawings, FIGS. 1 and 2 illustrate the coupling structures of the present invention. FIG. 1 shows a coupling structure having a substrate 10a with a grating 12a. A waveguide film 14a of general thickness $t_f$ is disposed on the substrate 10a, and a cover medium 16a is disposed on the waveguide film 14a. The waveguide film 14a tapers from a general thickness, $t_f$, to a thickness of about zero in the area of adjacency of the film 14a and grating 12a.

FIG. 2 similarly shows a coupling structure having a substrate 10b with a grating 12b. A waveguide film 14b of general thickness $t_f$ is disposed on the substrate 10b, and a cover medium 16b is disposed on the waveguide film 14b. The waveguide film 14a increases from a general thickness, $t_f$, to a thickness greater than thickness $t_f$ in the area of adjacency of the film 14b and grating 12b. The thickness increase creates a taper in the region of the grating 12b. At the end of the taper, the film 14b preferably has another region of uniform thickness, $t_f$.

An incident beam 18 is diffracted off the grating 12 at the interface of the waveguide 14 and substrate 10. The diffracted beam undergoes total internal reflection off the tapered portion of the guiding film 12. The taper changes the propagation angle within the waveguide such that upon leaving the tapered region, the beam is traveling at the correct propagation angle for the guided mode.

The taper changes the angular acceptance of the grating coupler 12 through two effects. The first effect is that a beam diffracted from the grating undergoes different numbers of bounces off the taper, depending on the diffraction angle. Because each bounce changes the propagation angle in the waveguide, bouncing can be used to compensate for the changes in propagation angle with incidence angle.

The second effect is that the shift induced by the bounces changes the coupling angle of incidence. When so designed, this can lower the value of the angular dispersion of the grating, reducing change in diffraction angle due to change in incidence angle.

The effect of the taper on the grating coupler in FIG. 1 will now be considered in order to optimize the acceptance-broadening due to the taper. The following descriptions can be applied to the acceptance-narrowing configuration of FIG. 2 by reversing the sign of the taper angle, $\alpha$. The taper angle, $\alpha$, is, as illustrated, the angle of incline or decline of the tapered portion of the waveguide film 14 relative to the grating 12 and substrate 10. The angle $\alpha$ is positive when the film thickness, $t_f$, is decreasing in the grating area near the end of the taper, and negative when the film thickness, $t_f$, is increasing in the grating area near the end of the taper.

Referring to FIG. 1, the final propagation angle, $\Theta_p$, is calculated in the waveguide as a function of the angle of incidence from air, $\Theta_i$, using a ray tracing program, for example. This enables an evaluation of the theoretical acceptance range because waveguide mode will only support a fixed range of propagation angles. The ray tracing approach assumes an infinitesimally small beam diameter that is diffracted from the edge of the grating at a taper distance, $D_t$, from the end of the tapered region.

Figure 3:
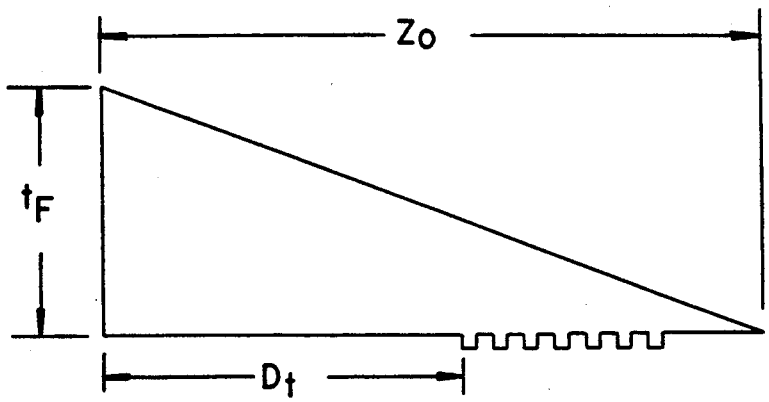
FIG. 3 is a diagrammatic sectional view of an optical waveguide structure illustrating a linear profile used in ray tracing calculations along with the definition of the $D_t$ and $z_0$ parameters for the linear profile.

Referring to FIGS. 1-5, the effect of a linear taper of angle $\alpha$ on the diffracted beam is shown in FIG. 1. The beam diffracted at an angle $\Theta_d$ relative to the substrate normal is incident at the taper interface at an angle $\Theta_d+\alpha$ due to the taper. Given that the reflected angle is equal to the incidence angle, the reflected beam will be incident at the substrate interface at an angle of $\Theta_d+2\alpha$ relative to the substrate normal. This $2\alpha$ increase in propagation angle will occur for every reflection off the taper surface. The net result is a shift of $2\alpha n$, where n is the number of bounces off the taper surface. The taper distance, $D_t$, is the distance from the edge of the diffraction grating to the end of the taper. The shift due to the taper is dependent on the number of bounces off the taper, and more taper bounces result from longer taper distances. The maximum limit on the taper distance is determined by the taper profile. The taper length, $z_0$, is the full length of the taper, as shown in FIG. 3. This is related from geometry to the previous $\alpha$ angle by $$z_0 = \frac{t_f}{\tan(\alpha)} \quad (1)$$

where $t_f$ is the waveguide film thickness. Neglecting the finite size of the beam, the maximum taper distance, $D_t$, is $z_0$. The effect of the linear taper is therefore described by the taper length, $z_0$, and the taper distance, $D_t$. Equation (1) is for linear tapers, but it is useful to determine average value of $\alpha$ for other taper profiles.

Figure 4:
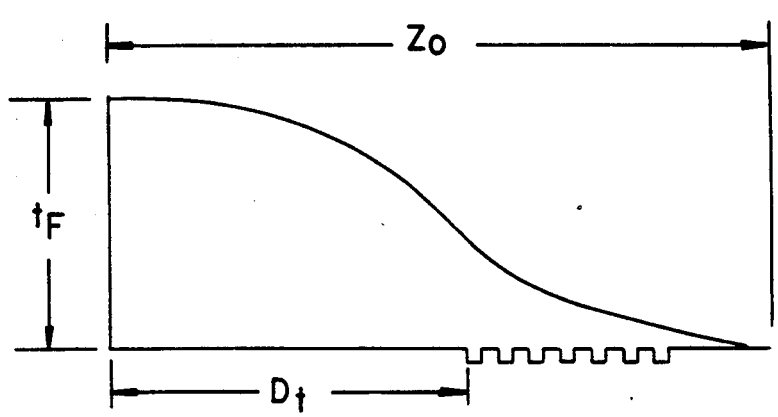
FIG. 4 is a diagrammatic sectional view of an optical waveguide structure similar to FIG. 3, but illustrating a cosine profile used in ray tracing calculations along with the definition of the $D_t$ and $z_0$ parameters for the cosine profile.
Figure 5:
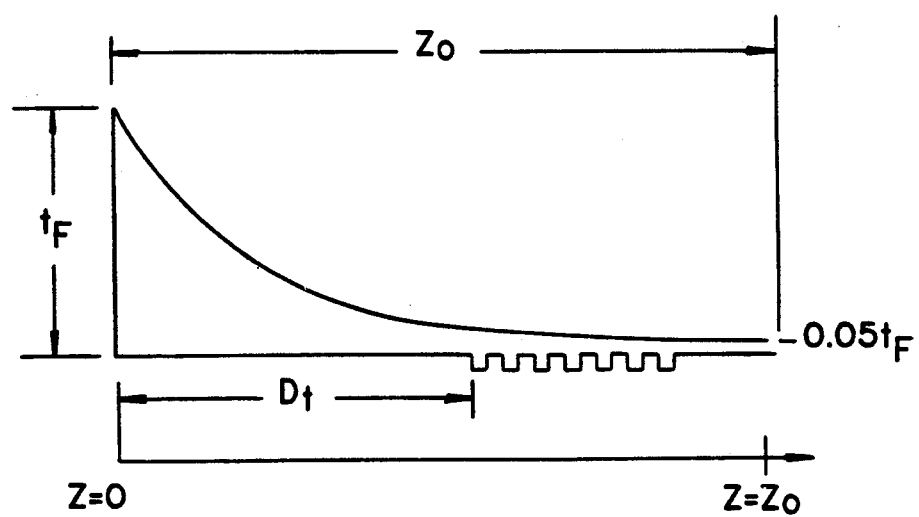
FIG. 5 is a diagrammatic sectional view of an optical waveguide structure similar to FIGS. 3 and 4, but illustrating an exponential profile used in ray tracing calculations along with the definition of the $D_t$ and $z_0$ parameters for the exponential profile.

Three different taper profiles were considered because the tapers fabricated were not linear. Experimentally, tapers which were formed by a shadow in vacuum deposition were found to have a taper profile similar to a cosine function (FIG. 4). Tapers formed by dip coating methods were found to approximate an exponential decay in thickness across the taper (FIG. 5). The waveguide film thickness, $t_f$, as a function of position, z, for each of the profiles depends on the taper length, $z_0$. The definition of $z_0$ for these different profiles is made with the idea of this being the maximum taper distance, $D_t$, that is allowed.

The range of possible angles of incidence are determined by the requirement that the diffracted beam remain in the waveguiding film. The angle of the diffracted beam can be calculated from the general grating diffraction equation.

$$n_i \sin(\Theta_i) + n_d \sin(\Theta_d) = \frac{m\lambda}{d}, \quad (2)$$

where $\Theta_i$ is the angle of incidence, $\Theta_d$ is the diffracted angle, m is a positive integer, $\lambda$ is the wavelength of the diffracted beam, d is the period of the diffraction grating, and $n_i$ and $n_d$ are the refractive indices of the incident and diffracted media, respectively. These variables are shown in FIG. 1 where $\Theta_i''$ is the incidence angle within the substrate, and the refractive indices, $n_i$ and $n_d$, each equal $n_f$ because the incidence and diffraction of interest occurs in the film. For the diffracted beam to remain in the waveguiding film, there must be a real solution to equation (2) (e.g., $\Theta_d \leq 90°$). When $\Theta_d = 90°$ is substituted into Eq. (2), the result is the maximum angle of incidence, $\Theta_i''$, for diffraction to occur. The minimum angle of incidence is determined by the diffraction angle at which total internal reflection no longer occurs at the interface of the film and substrate (e.g., the grating couples into a substrate mode). The critical angle, $\Theta_c$, for the interface is $$\Theta_c = a\sin\left(\frac{n_s}{n_f}\right). \quad (3)$$

$\Theta_c$ can be substituted for $\Theta_d$ in Eq. (2) to get the maximum angle of incidence for a diffracted beam to remain confined in the waveguide film.

The relationship between the measurable angle of incidence in air and the limiting angles of incidence at the grating can be determined. By retracing the beam incident on the grating back to the taper surface, it is found that the incidence angle just inside the film, $\Theta_r$, can be expressed as $$\Theta_r = \Theta_i'' + \alpha. \quad (4)$$

The beam at the taper interface has undergone refraction according to Snell's law $$\sin(\Theta_i') = \frac{n_f}{n_0}\sin(\Theta_r), \quad (5)$$

where $n_0$ and $n_f$ are the indices of the media as shown in FIG. 1, and $\Theta_i'$ is the incidence angle relative to the taper normal. The conversion of the incidence angle relative to the substrate normal, $\Theta_i$, can be expressed as $$\Theta_i = \Theta_i' - \alpha. \quad (6)$$

The relation of the angle of incidence in the cover medium, $\Theta_i$, to the angle of incidence in the film, $\Theta_i''$, is given by the combination of Eqs. (4)–(6). This can be combined with Eqs. (2) and (3) to find the initial diffraction angle, $\Theta_d$, for a given air incidence angle, $\Theta_i$.

The effect of coupling was evaluated using a ray tracing approach. These results are expressed as angular dispersion curves $\Theta_p$ vs. $\Theta_i$ in FIGS. 6-8 for different coupler structures wherein $\Theta_p$ is the propagation angle. The propagation angle within the taper is increased by $2\alpha$ for each bounce off the taper; where $\alpha$ is a function of z for nonlinear tapers. The ray tracing program calculates the final propagation angle in the waveguide, $\Theta_p$, after the beam traverses the tapered region. This calculation with equations 2-6 was performed for the range of incidence angles that had a trapped diffracted beam.

Figure 6:
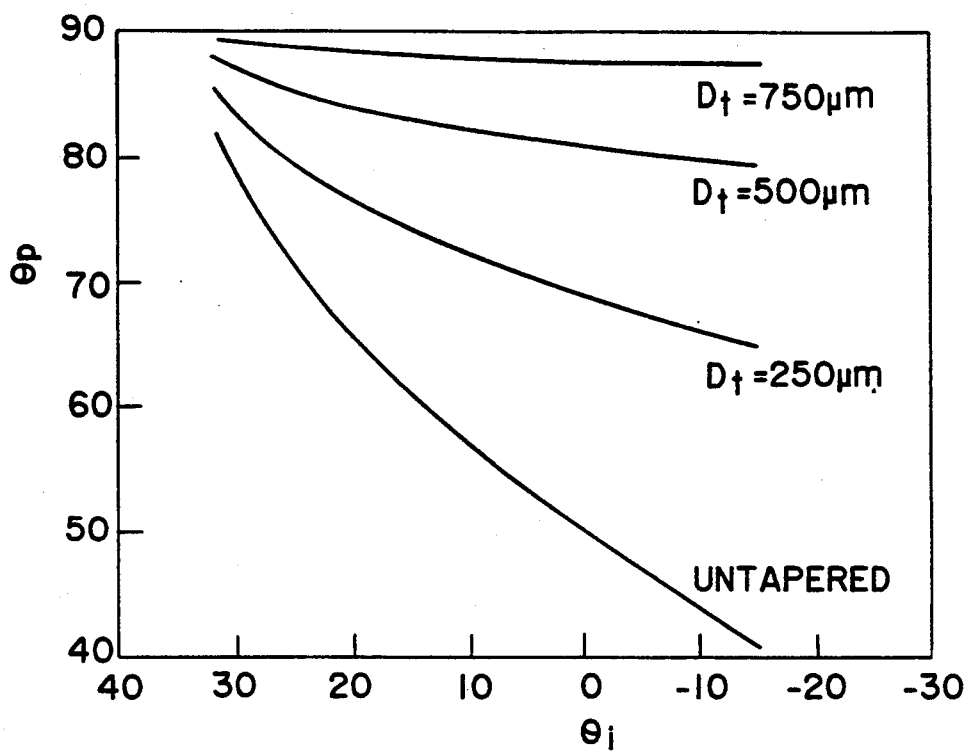
FIG. 6 graphically illustrates $\Theta_p$ vs. $\Theta_i$ dependence from ray tracing for a cosine profile with $\lambda = 0.6328$ μm, $d = 0.36$ μm, $n_0 = 1.0$, $n_2 = 1.46$, $n_f = 2.3$, and $t_f = 0.20$ μm, and illustrates the $D_t$ dependence for a given taper of length $z_0 = 1000$ μm, with $D_t = 250$, 500, and 750 μm.

For a cosine taper with $z_0 = 1000$ μm, and $D_t = 250$, 500 and 750 μm, the results are shown in FIG. 6. The untapered result, $D_t = 0$, is also shown for comparison. The angular shift due to the taper increases the propagation angle thereby decreasing the $\Theta_i$ necessary to obtain a given $\Theta_p$. With increased taper distance, $D_t$, the propagation angle for a given incidence angle increases further.

Figure 7:
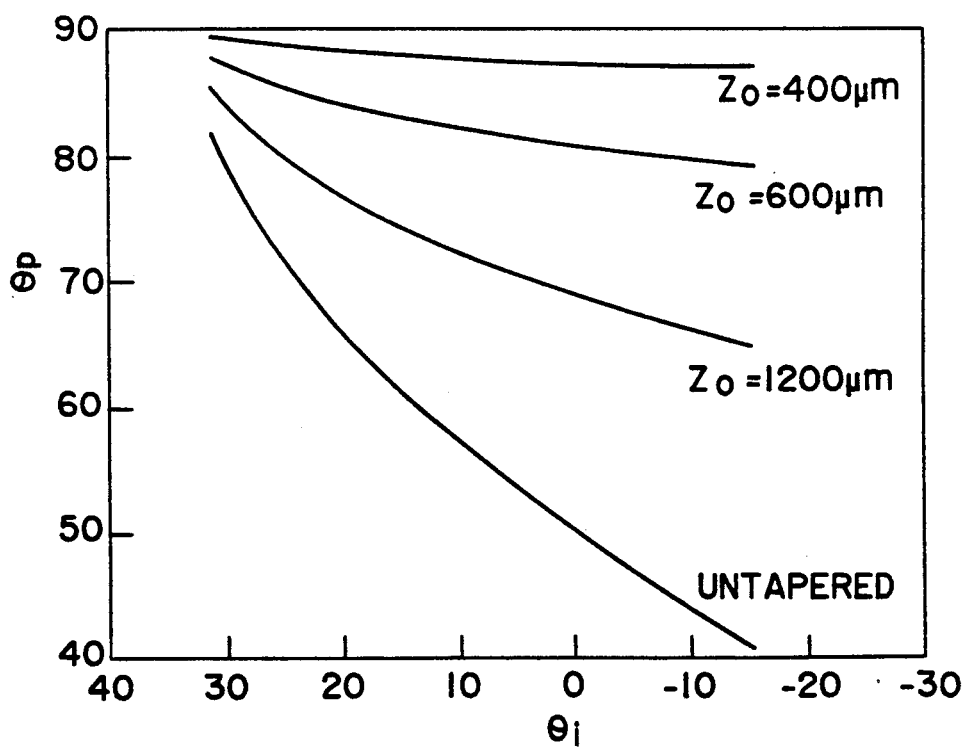
FIG. 7 graphically illustrates $\Theta_p$ vs. $\Theta_i$ dependence from ray tracing for a cosine profile similar to FIG. 6 with $\lambda = 0.6328$ μm, $d = 0.36$ μm, $n_0 = 1.0$, $n_s = 1.46$, $n_f = 2.3$, and $t_f = 0.20$ μm, but illustrates the $z_0$ dependence for the constant taper input position $D_t = 300$ μm, and $z_0 = 400$, 600, and 1000 μm.

The dispersion results were calculated for a cosine profile with $D_t = 300$ μm, and $z_0 = 400$, 600, and 1200 μm as shown in FIG. 7. Increasing the taper length, $z_0$, decreases the propagation angle for a given incidence angle. In comparing FIGS. 4a and 4b, it is not the magnitude of $D_t$ or $z_0$ that is of interest, rather the taper ratio $D_t/z_0$. This can be seen by comparing the $D_t = 500$ μm line in FIG. 6 with the $z_0 = 600$ μm line in FIG. 7. These two tapers have a $D_t/z_0$ ratio of 0.5, and, notwithstanding that the tapers are of different lengths, the $\Theta_p$ vs. $\Theta_i$ dependence is identical. Qualitatively, the taper ratio may be viewed as essentially the percentage of the taper that is utilized in shifting the propagation angle within the taper.

Figure 8:
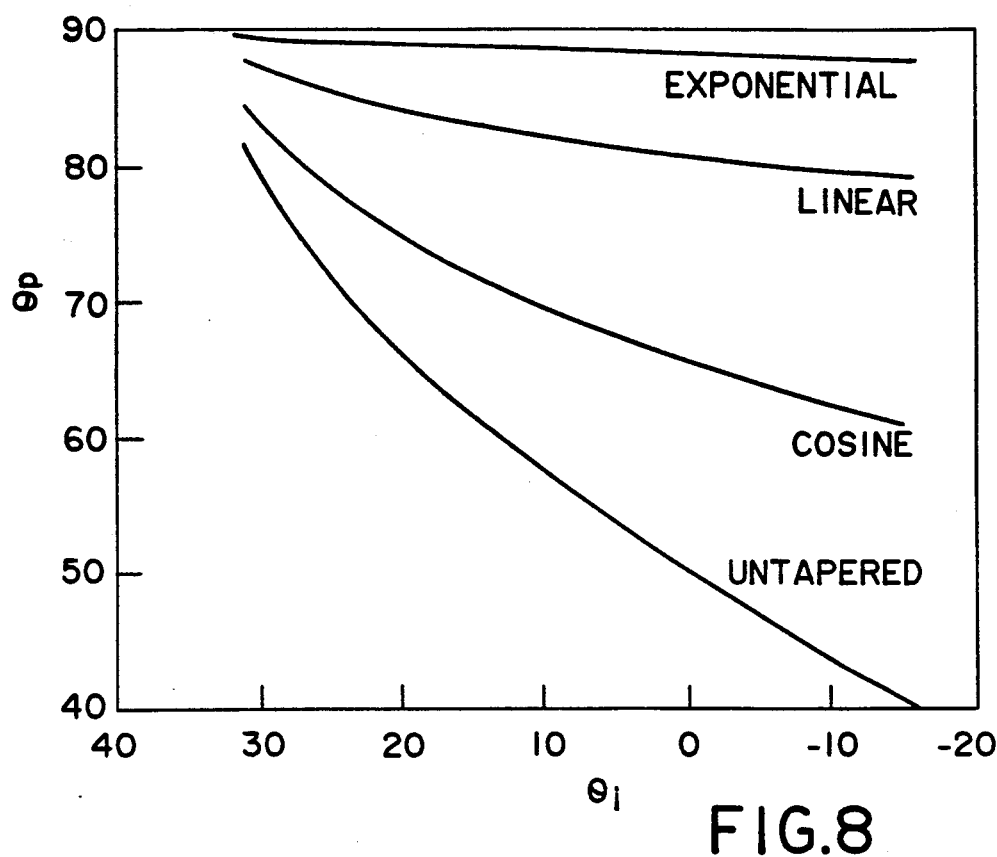
FIG. 8 graphically illustrates the $\Theta_p$ vs. $\Theta_i$ calculated by ray tracing for the linear, cosine and exponential profiles with a constant taper ratio, $D_t/z_0$, of 0.5 assuming $l = 0.6328$ μm, $d = 0.36$ μm, $n_0 = 1.0$, $n_s = 1.46$, $n_f 2.3$, and $t_f = 0.20$ μm.

Referring to FIG. 8, the effects of different taper profiles on the propagation angle are shown. The untapered $\Theta_p$ vs. $\Theta_i$ plot is shown as well as that for linear, cosine, and exponential tapers, each with a taper ratio, $D_t/z_0$ of 0.5. While the taper ratio describes the shift for any given profile, the amount of shift is also dependent on the profile itself. There is dependence because the average value of the taper angle $\alpha$ changes with the profile, depending on what portion of the taper is being used. Therefore, when $\alpha$, which is a function of z, has a higher average value between the input position on taper and the beginning of the waveguide, a larger taper shift results.

Figure 9:
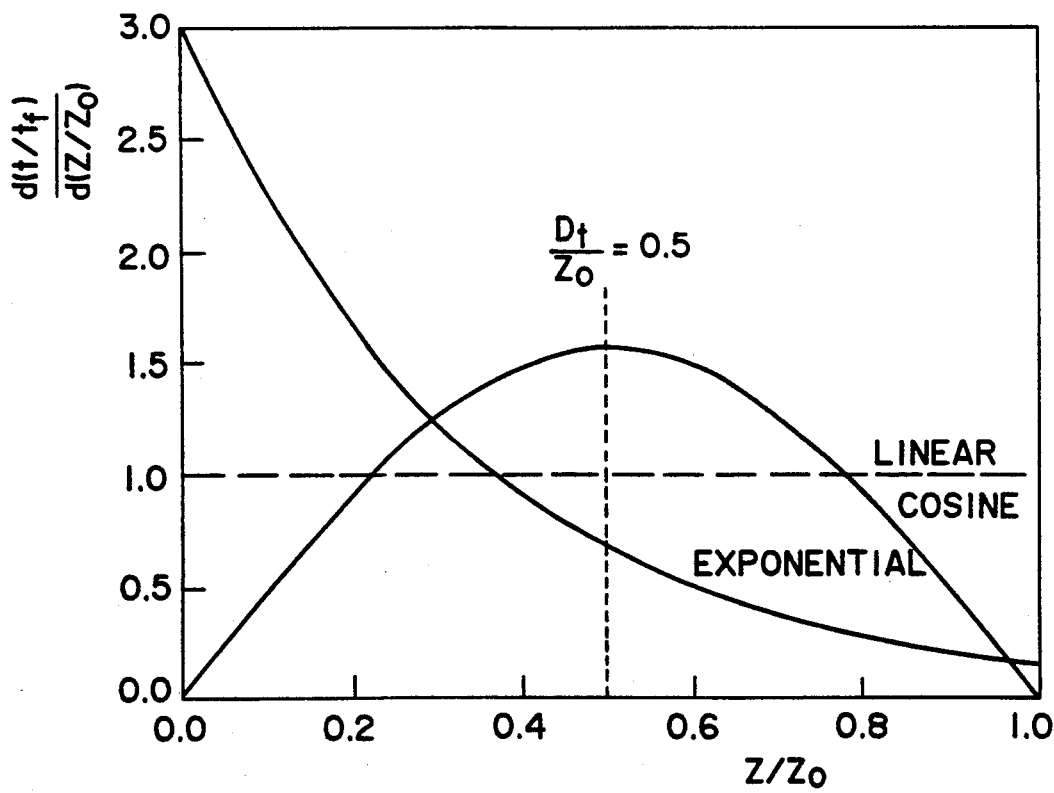
FIG. 9 graphically illustrates the normalized taper slope $d(t/t_f)/d(z/z_0)$ as a function of taper position for the linear, cosine, and exponential curves of FIG. 8 with the input position of $D_t/z_0 = 0.5$ shown and with propagation toward the waveguide taking place to the left toward $z/z_0=0$.

Referring now to FIG. 9, the normalized taper angle as a function of taper position for the different profiles calculated is shown. Although the exponential profile has the smallest value for $\alpha$ at $z/z_0=0.5$, the average value of $\alpha$ between $z/z_0$ of 0.5 and 0 is larger than that for the linear and cosine profiles. Therefore, as expected from FIG. 8, the exponential profile shows the largest taper shift. Even though the several profiles have different taper shifting at the same taper ratio, variation of the taper ratio allows equivalent taper shifts and acceptance-broadening to be achieved using any of the taper profiles. The profile shape must be considered for design, but any well-controlled profile shape is adaptable.

Figure 10:
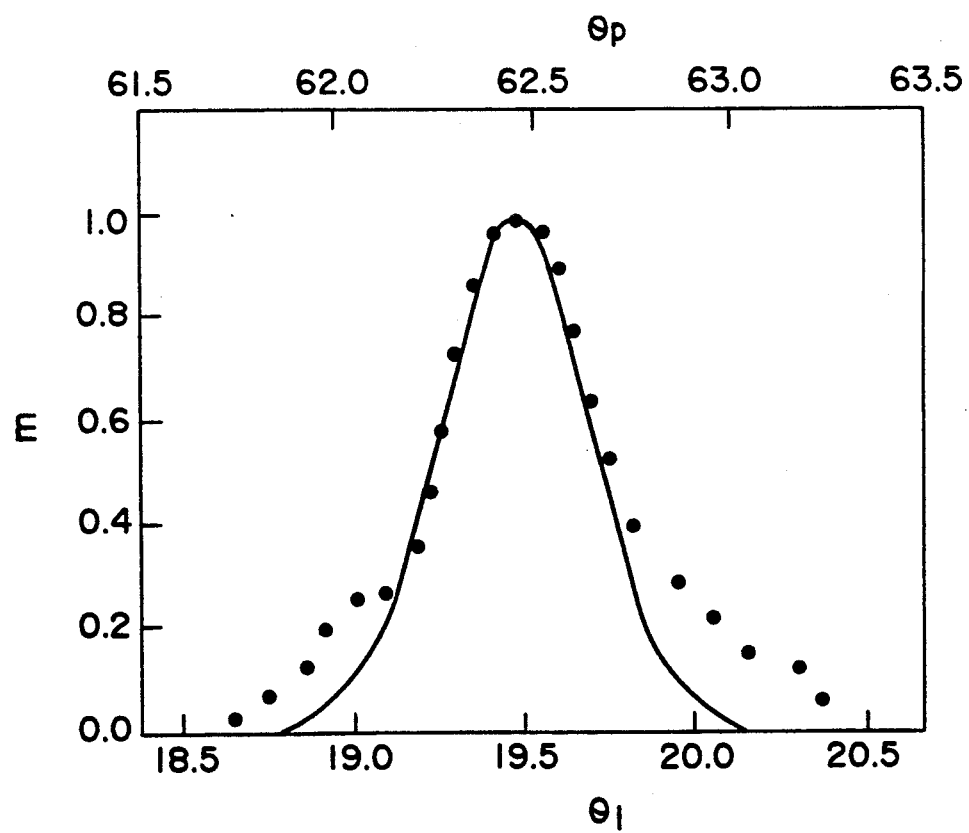
FIG. 10 graphically illustrates the experimentally measured relative coupling efficiency $\eta$ vs. incidence angle $\Theta_i$ for a 0.2 $\mu$m ZnS film on quartz.

To optimize the taper structure, acceptance-broadening resulting from the taper shift needs to be calculated. All angular broadening results can be recast as wavelength broadening results using the grating relationship between $\Theta_i$ and $\lambda$ given in the grating diffraction equation, Eq. (2). To determine the acceptance-broadening due to the taper, the acceptance of a traditional grating coupler must be known. The coupling efficiency $\eta$ measured as a function of incidence angle $\Theta_i$ for a grating coupler is shown in FIG. 10. Using Eq. 2, $\Theta_i$ is converted to the mode propagation angle $\Theta_p$ within the waveguide. The range of propagation angles is broader than the theoretical single propagation angle because the finite size and divergence of the laser beam give rise to a slight broadening. Assuming that propagation angle dependence is the characteristic acceptance of the waveguide structure for the particular beam used (1 mm collimated beam) and that it is independent of the type of coupler used to get the light into the waveguide. Then, because the $\eta$ vs. $\Theta_p$ curve is taken to be a constant for the given waveguide and laser beam, angular broadening in the $\eta$ vs. $\Theta_i$ curve must be accomplished by reducing the angular dispersion of the coupler, $d\Theta_p/d\Theta_i$, at the coupling angle of incidence. Reduction of the angular dispersion of the coupler has been shown in the $\Theta_p$ vs. $\Theta_i$ ray tracing results for FIGS. 4 and 5.

Figure 11:
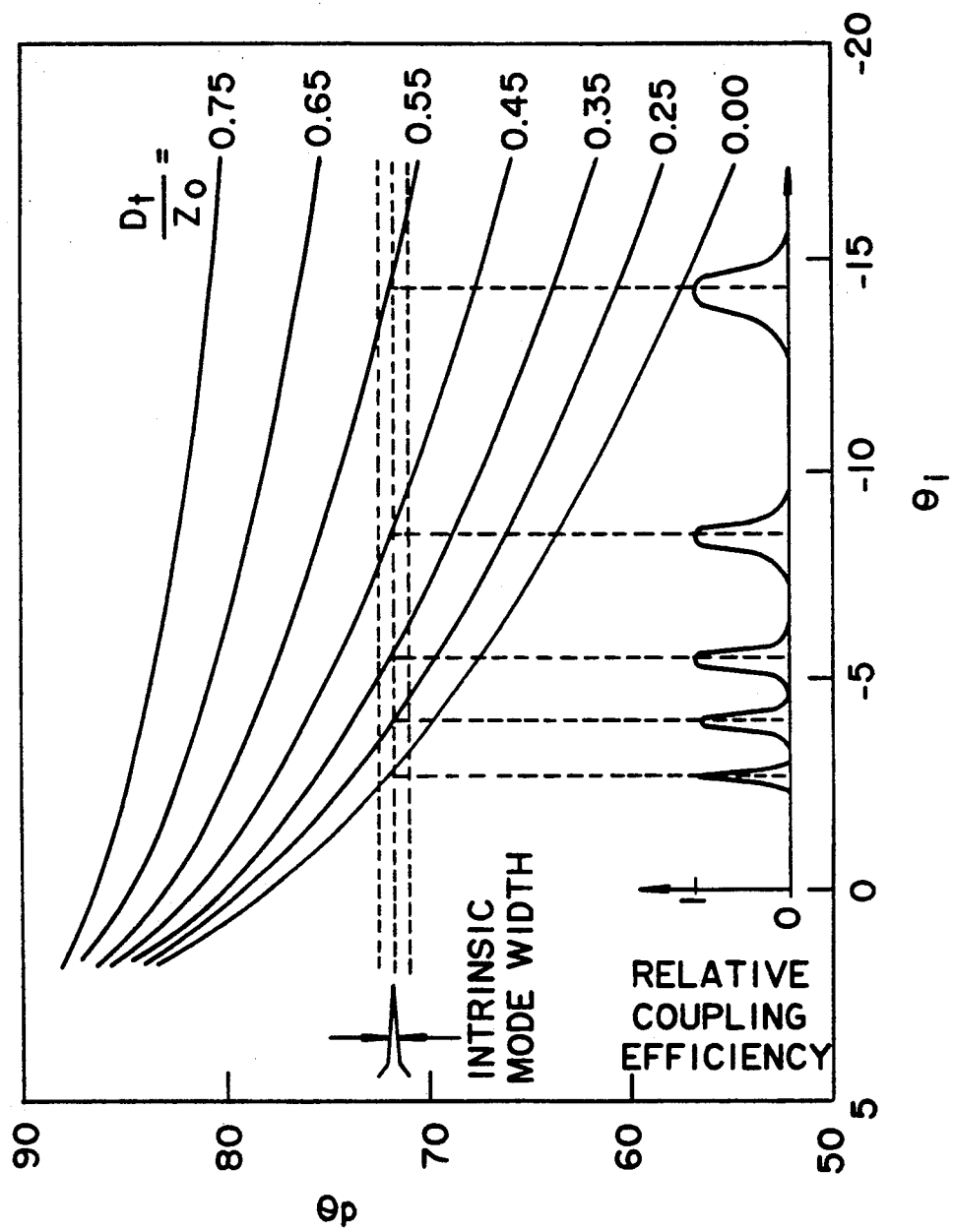
FIG. 11 graphically illustrates the calculated dispersion relation $\Theta_p$ vs. $\Theta_i$ for different taper ratios for a grating-to-tapered film coupler wherein is overlaid the propagation angle axis the $\eta$ vs. $\Theta_p$ dependence from FIG. 10.

FIG. 11 illustrates a conversion to acceptance-broadening, which is a $\Theta_p$ vs. $\Theta_i$ plot for various taper ratios. Superimposed on FIG. 11 is a plot of the intrinsic mode width. The broadening in incidence angle is illustrated for different taper ratios by the superposition of the efficiency plot onto the angular dispersion curves. Taper shifting above the optimum taper ratio $D_t/z_0=0.57$ yields final propagation angles that cannot match the intrinsic propagation angle. Maximum broadening occurs with the taper that has the minimum angular dispersion at the propagation angle for the mode being coupled. This occurs at the minimum in allowable incidence angle near the substrate mode. The variable which describes the broadening effect of the hybrid coupler is the angular dispersion at the coupling angle, $(d\Theta_p/d\Theta_i)\Theta_p=\Theta_m$, henceforth referred to as the coupler dispersion. Because the angular dispersion curves are approximately linear over the angular range of interest, FIG. 11 provides an accurate figure of merit for comparing different coupler structures.

The following experiments used substrates of quartz, with index $n_s=1.46$, and cover media of air, with index $n_0=1.0$. The film refractive index $n_f$ and the grating period d were the variables left to optimize.

To maximize the acceptance width of the coupler, the angular dispersion of the coupler $d\Theta_p/d\Theta_i$ should be minimized. The previous ray tracing results of FIG. 11 illustrate that the minimum dispersion for any taper ratio occurs near the coupling angle for the substrate mode which is the minimum angle of incidence. Further, for couplers that couple at the minimum angle of incidence, the dispersion decreases with higher taper ratios. To obtain coupling at the minimum angle of incidence and higher taper ratios $D_t/z_0$, the intrinsic mode propagation angle $\Theta_m$ of the waveguide should be maximized. Because the intrinsic mode propagation angle is proportional to the waveguide thickness $t_f$, the waveguide thickness should be maximized to minimize dispersion. To maximize the intrinsic mode propagation angle for TE single mode waveguides, the thickness of the waveguide was taken to be the cutoff thickness of the $TE_1$ mode which is the maximum allowable waveguide thickness while maintaining only one mode.

Figure 12:
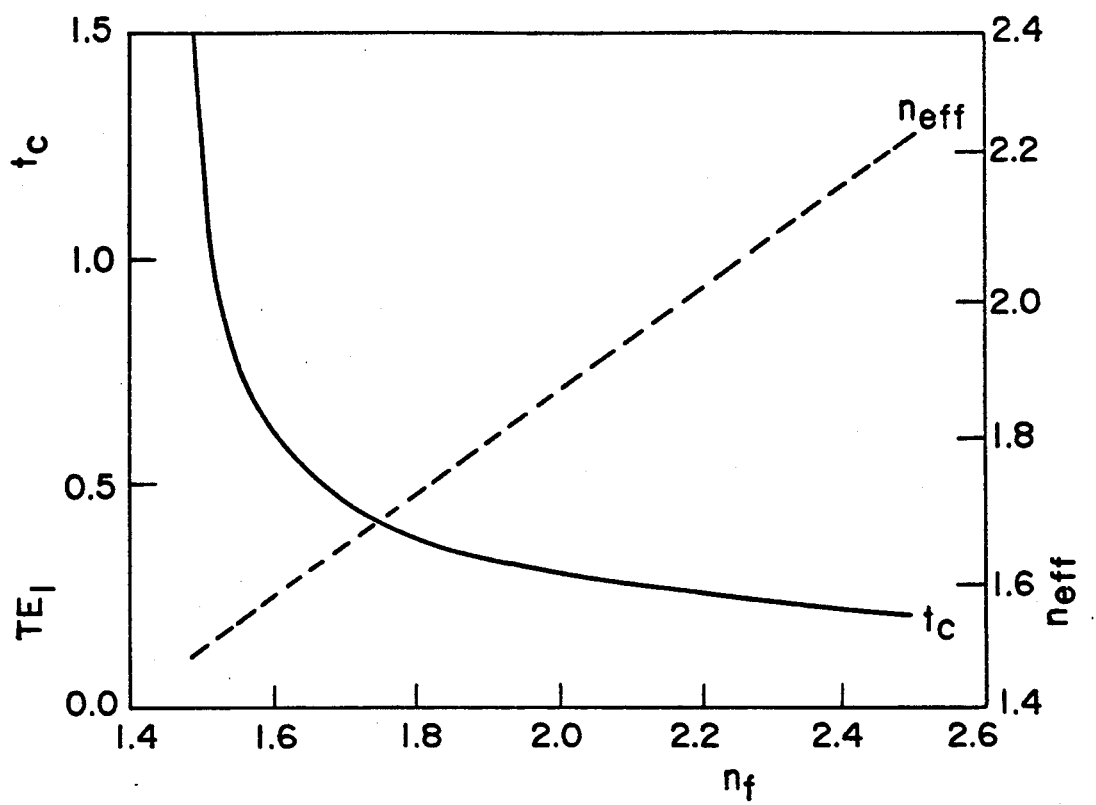
FIG. 12 graphically illustrates the calculated cutoff thickness for the $TE_1$ mode vs. film refractive index, $n_f$, for films on quartz (n=1.46) with $\lambda=0.6328$ $\mu$m.
Figure 13:
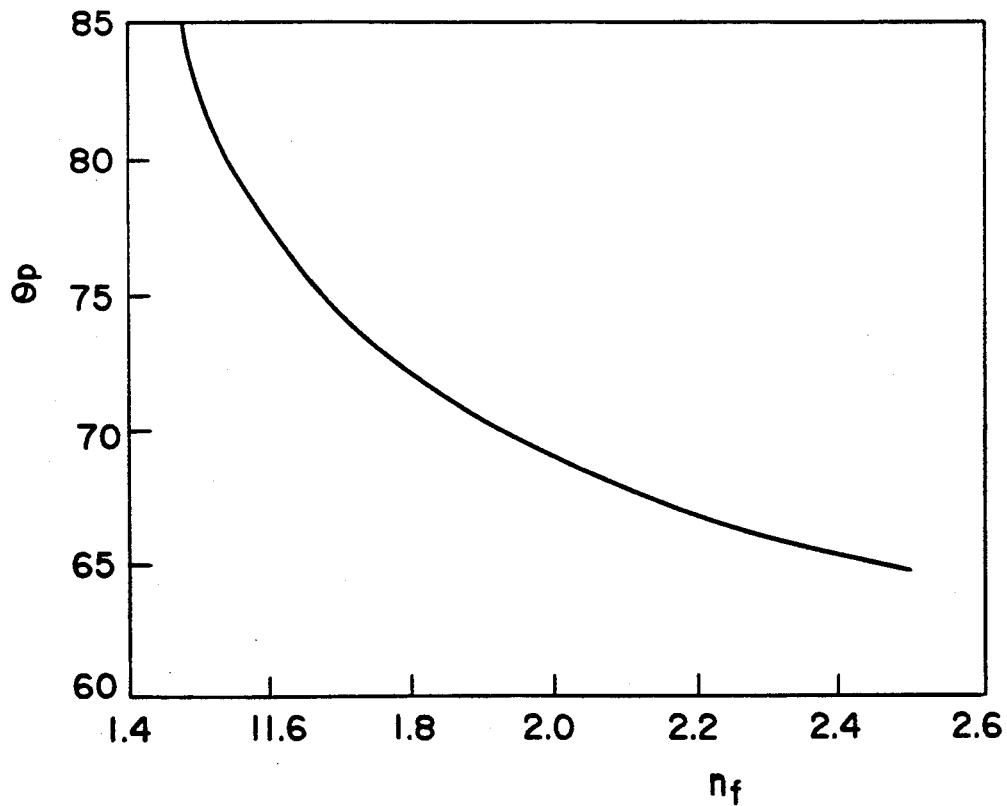
FIG. 13 graphically illustrates the maximum propagation angle of $TE_0$ single mode waveguide as a function of the films' refractive index for films on quartz (n=1.46 and $\lambda=0.6238$ $\mu$m) using the effective refractive index results shown in FIG. 12.
Figure 14:
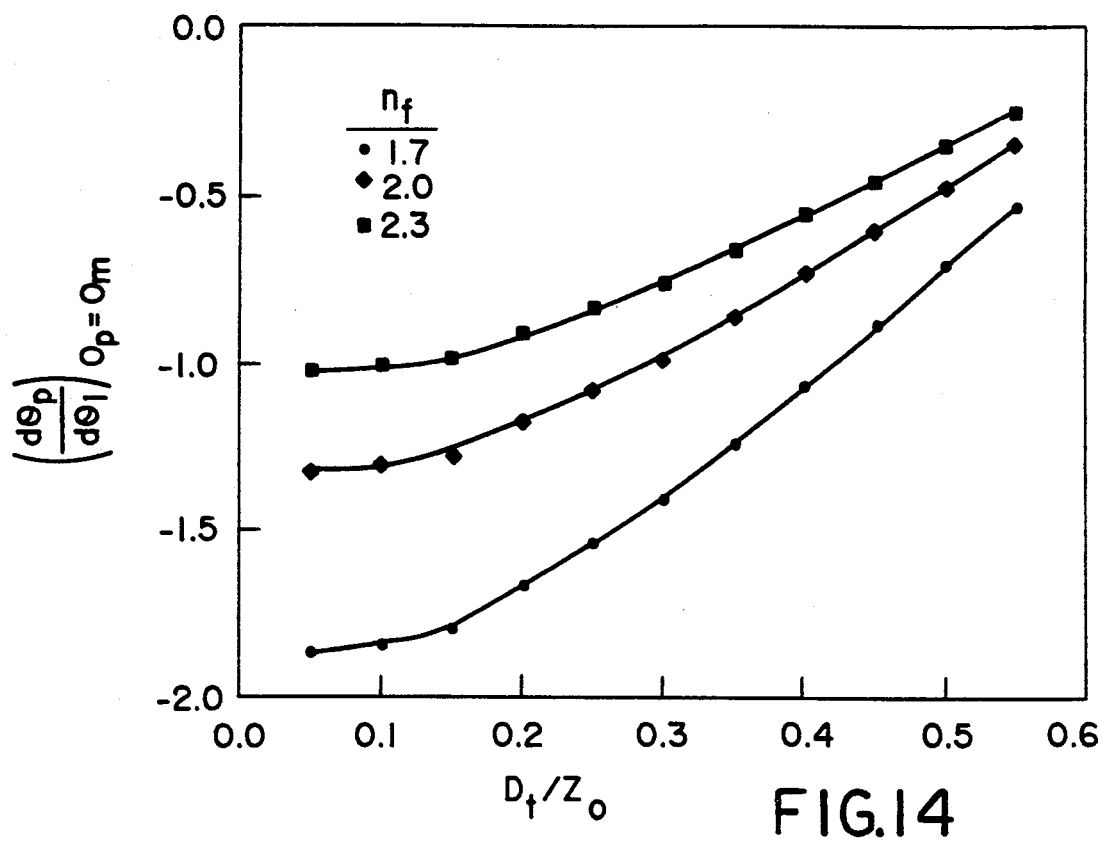
FIG. 14 graphically illustrates the calculated angular dispersion of the coupler $d\Theta_p/d\Theta_i$ at the coupling angle of incidence as a function of the taper ratio with different film refractive indices ($n_f=1.7, 2.0,$ and 2.3) shown to compare the acceptance-broadening capability of different films.

Referring to FIGS. 12-14, the cutoff thickness for the $TE_1$ mode was calculated for film refractive indices between 1.5 and 2.5. The effective index, $n_{eff}$, was then calculated using the cutoff thickness, the cover, substrate and film indices, and wavelength. The effective index and the film index were used to calculate the mode propagation angle within the waveguide, $\Theta_m=\sin^{-1}(n_{eff}/n_f)$, for the range of film refractive index (FIG. 13). Film refractive indices of 1.7, 2.0, and 2.3 were chosen for the angular dispersion calculations. The coupler dispersion, $(d\Theta_p/d\Theta_i)\Theta_p=\Theta_m$, was then calculated as a function of the taper ratio $D_t/z_0$ using the ray tracing program. These coupler dispersion functions for the three different film refractive indices are shown in FIG. 14. It can be seen from FIG. 14 that the higher film refractive index reduces the angular dispersion and therefore broadens the angular acceptance of the coupler. The relative broadening is defined here as the coupler dispersion $(d\Theta_p/d\Theta_i)\Theta_p=\Theta_m$ for the optimum taper ratio $D_t/z_0=0.57$ over that for zero taper $D_t/z_0=0$. The highest film refractive index 2.3 shows the most relative broadening, about 4.3X, compared to 4.0X for $n_f=2.0$ and 3.5X for $n_f=1.7$. Therefore, the higher the film refractive index, the broader the angular acceptance.

Figure 15:
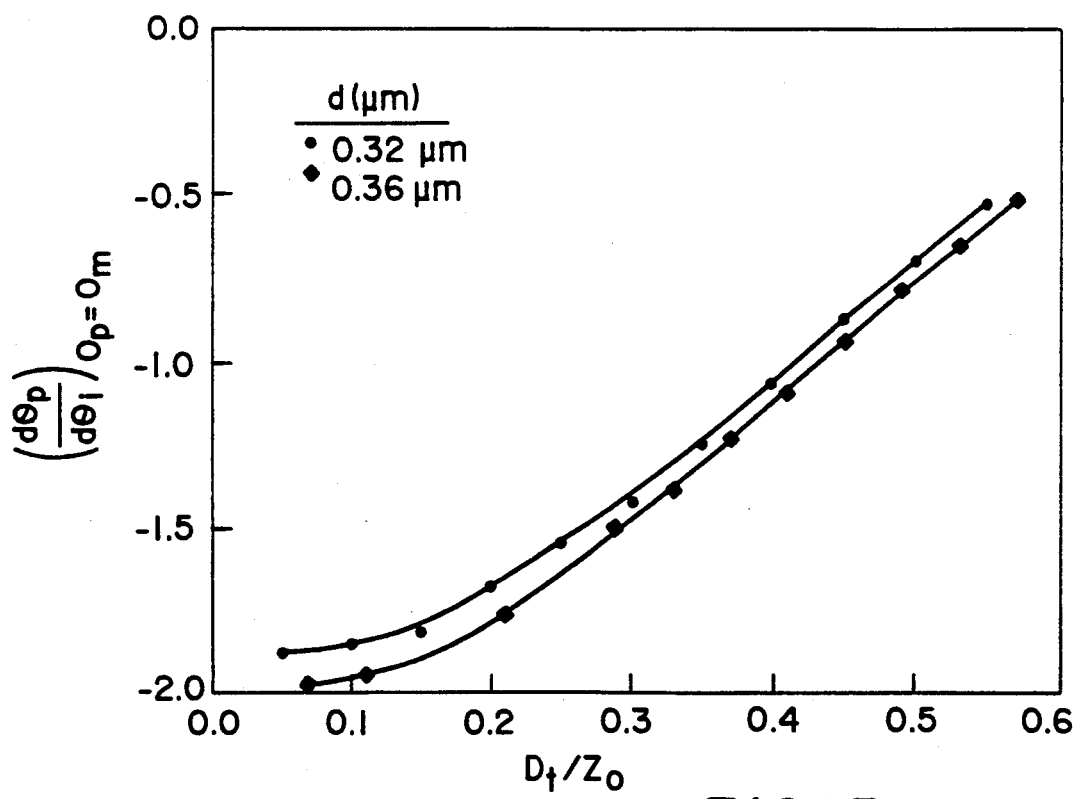
FIG. 15 graphically illustrates the angular dispersion of the coupler $d\Theta_p/d\Theta_i$ shown as a function of taper ratio $D_t/z_0$ for different grating periods (d=0.38, 0.36, and 0.32 $\mu$m).
Figure 17:
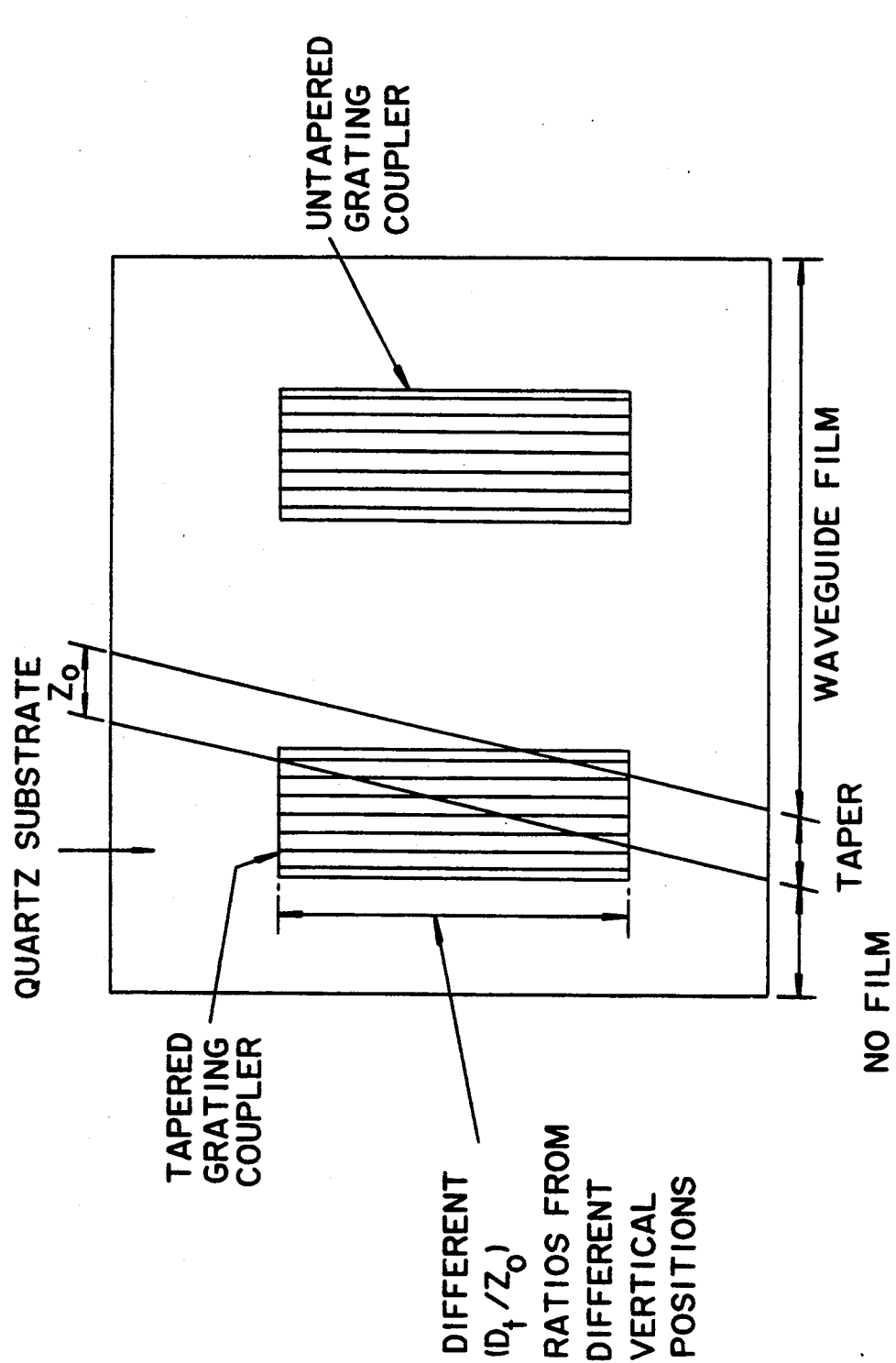
FIG. 17 illustrates the geometry of the samples fabricated wherein both a tapered and an untapered grating result on the same waveguide.

Referring to FIG. 15, the coupler dispersion was also calculated for two grating periods that were available for experimentation, $d=0.32$ 'm and 0.36 $\mu$m. The coupler dispersion vs. taper ratio is plotted for these periods in FIG. 15. Generally, the dispersion decreases with the grating period. A decrease in the grating period can effect the coupler diffraction efficiency. Efficiency losses should therefore be considered when decreasing the grating period to broaden acceptance. Although no attempt was made to optimize the efficiency of the grating to taper couplers, the efficiencies measured experimentally were equal for tapered and conventional grating couplers. To optimize the grating to tapered coupler efficiency, there are additional considerations for previous grating coupler designs. One consideration is that the coupling angle of incidence is shifted by the taper. A second consideration is that the effective refractive index at the point of coupling is lower than in the uniform waveguide. A third consideration is that $n_{eff}$ varies with propagation distance. It is expected that with these additional considerations, the maximum theoretical coupling efficiency will be the same for either a tapered or conventional grating coupler.

Again referring to FIGS. 1-5, a weakness of ray tracing calculations is that the possibility of interference within the taper is ignored. Within the taper region the beam is not yet propagating at the mode propagation angle because it only reaches that angle as it exits the tapered portion of the waveguide. The result is that the roundtrip phase shift during propagation in this region is not equal to an integral number of wavelengths. This could allow for the possibility of interference in the tapered region. Interference does not occur because, in the propagating region, the wave vector direction is changed by $2\alpha$ from each taper bounce. If the $2\alpha$ change is large enough, interference does not occur.

The angular shift induced by the taper is not continuous, but rather a discrete function of the number of reflections within the taper. The effect of this on the $\Theta_p$ vs. $\Theta_i$ curve is that, while the general shape remains the same as predicted by ray tracing, locally the curve is discontinuous. Each continuous segment of the curve that intersects the intrinsic mode width contributes to the coupling efficiency as shown in FIG. 11. The overall coupling is the sum of the contribution from each continuous section. To obtain a continuous distribution, it is necessary to convolve the efficiency curves being summed such that they become indistinguishable. This is achieved by minimizing the taper angle, $\alpha$. Because the change in propagation angle is $2\alpha$ for a single taper bounce, the magnitude should be restricted to much less than the intrinsic mode width, i.e., $2\alpha << 0.5°$ (see FIG. 10).

If $2\alpha$ is small, interference different portions of a coupled beam that had a different number of reflections off the taper could occur. However, no evidence of this was seen in our experiments, down to a taper angle of $0.007°$.

The gratings were fabricated on polished quartz substrates. The substrates were coated with photoresist, exposed with a spatially filtered HeCd ($\lambda = 0.4416$ $\mu$m) beam, and developed using an in-situ monitoring process. The resulting photoresist gratings were then reactive ion etched into the quartz to a depth of 120 nm. The photoresist was then removed and the substrate thoroughly cleaned.

The tapered films were fabricated by two different methods. The first method was electron beam vacuum deposition which was shadowed by a cleaved silicon wafer. The second method was variable speed dip coating of organic solutions of polycarbonate or titanium ethoxide.

The electron beam deposited films were made of zinc sulfide, ZnS. This film was chosen because of the high refractive index of 2.3, ease of evaporation, and low optical loss less than 4 dB/cm resulting from deposition at slow rates less than 1 nm/sec. The ZnS film thickness was 190 nm, slightly less than the $TE_1$ cutoff thickness for ZnS on quartz of 205 nm. A cleaved edge of a silicon wafer was placed between the substrate and the evaporation source. The distance between the substrate and the shadowing wafer was varied from 2 cm to 10 cm, depending on the taper length desired. The farther the shadowing wafer was from the substrate, the longer, and shallower, was the taper.

Figure 16:
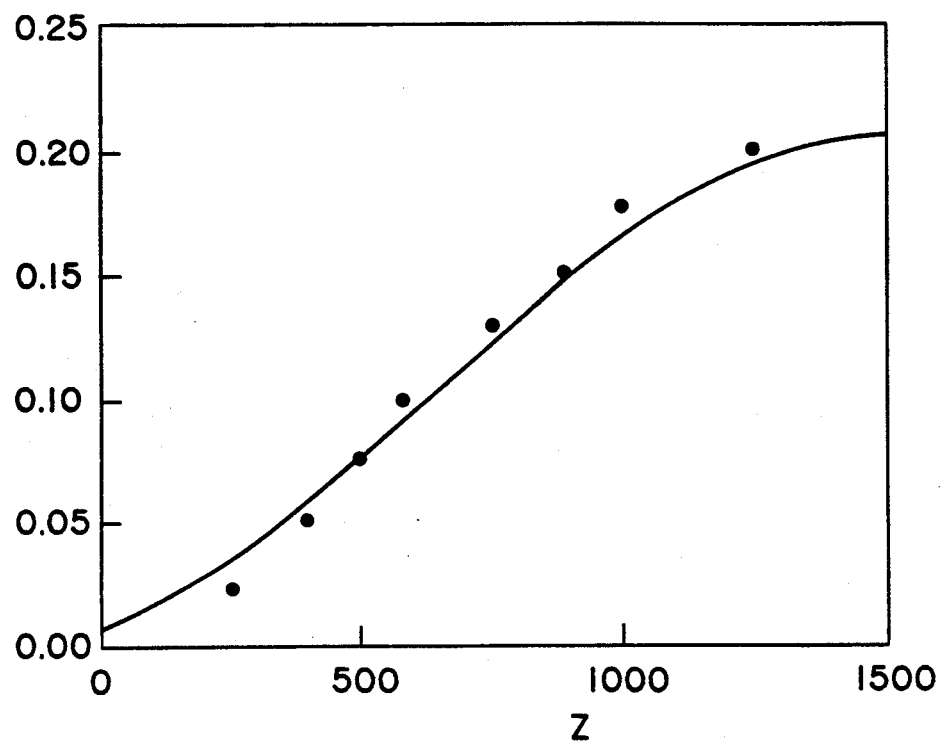
FIG. 16 graphically illustrates the film thickness measured by a profilometer of a taper fabricated by vacuum deposition as a function of position on the taper.

The first sample was shadowed from a distance of 10 cm yielding a taper length of 1600 $\mu$m from full film thickness of 190 nm to zero thickness. For a linear taper those dimensions correspond to an $\alpha$ of 0.007. However, a profilometer measurement of the taper reveals that the profile is more like a cosine curve (FIG. 16). The sample was cleaved and a scanning electron microscope was used to view a cross section of the taper to determine how completely the film filled in the grating grooves. The first area observed was at the end of the taper where the film thickness was nearly zero. An area was viewed at the coupling edge of the grating to determine the roughness of the taper surface at the input coupling position. The grating grooves are more gradual on the taper at the input coupling position when compared to the initial grating profile.

The waveguide on the second ZnS sample was thicker than the first at 200 nm, and the wafer shadowing distance was reduced to 2 cm. The resulting taper distance was reduced to 100 $\mu$m, corresponding to a linear taper angle, $\alpha \approx 0.1°$.

The second method of variable speed dip coating of organic solutions was used on the third sample. The third sample was formed by dip coating a quartz substrate in polycarbonate. The substrate was dipped into a solution of polycarbonate dissolved in bromobenzene. The substrate was then slowly drawn at a constant velocity of approximately 100 $\mu$m/sec giving a thickness of 400 nm. At the appropriate position, the drawing speed was increased to 400 $\mu$m/sec. The faster drawing speed left a film thickness of about 210 nm, with the change from 400 nm taking place over about 1000 $\mu$m corresponding to a linear taper angle $\alpha$ of $0.01°$, but the profile was found to resemble exponential taper more than a linear taper.

Referring to FIGS. 17-21, the sample grating periods were all confirmed to be 0.36 $\mu$m by measurement of the first order Littrow angle. The samples were fabricated with two gratings so that each had a grating that was tapered and one untapered under the uniform waveguide region. The coupling efficiency at $\lambda = 0.6328$ $\mu$m for the untapered grating was measured as a function of the incidence angle, and the propagation angle of the mode within the waveguide was calculated. The tapers were fabricated so that the taper position relative to the edge of the coupler grating varied across the grating enabling measurement of coupling characteristics for a range of taper ratios on each grating.

Figure 20:
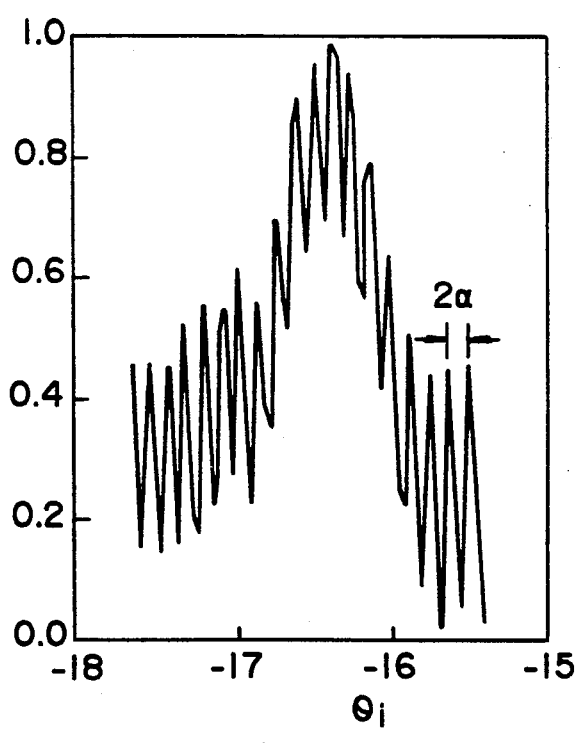
FIG. 20 graphically illustrates the coupling efficiency characteristics of the more sharply tapered ZnS sample of FIG. 18 similar to FIG. 19, but for the $\eta$ vs. $\Theta_i$ characteristics of the taper grating at a taper ratio of 0.55.
Figure 21:
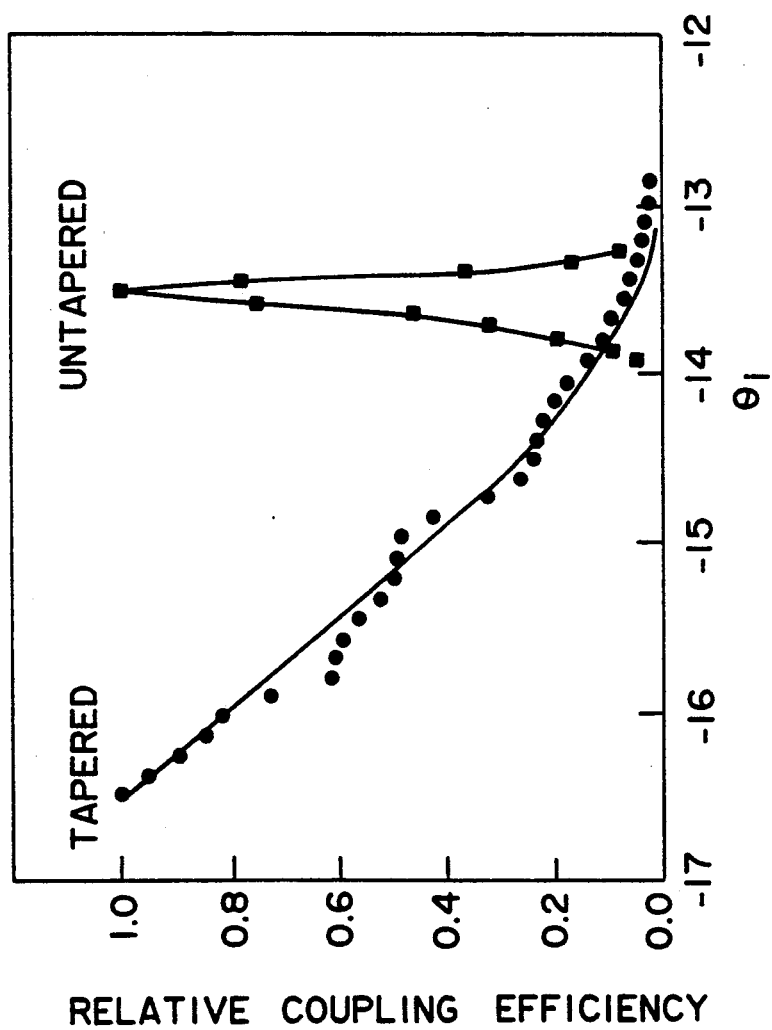
FIG. 21 graphically illustrates the coupling efficiency characteristics for a taper coupler fabricated with a polycarbonate film.

The first sample, with the shallowest taper, supported coupling from the entire grating (e.g., the $D_t/z_0$ ratio did not exceed the maximum allowed for the mode). The acceptance range, $\eta$ vs. $\Theta_i$, was measured at four positions along the edge of the grating with the resulting efficiency curves shown in FIG. 18. The second ZnS sample, with the steepest taper, supported coupling into the taper at only one edge (FIG. 20). Because of the positioning of the taper, the polycarbonate sample couples into the taper at the position corresponding to the smallest taper ratio (FIG. 21).

Figure 18:
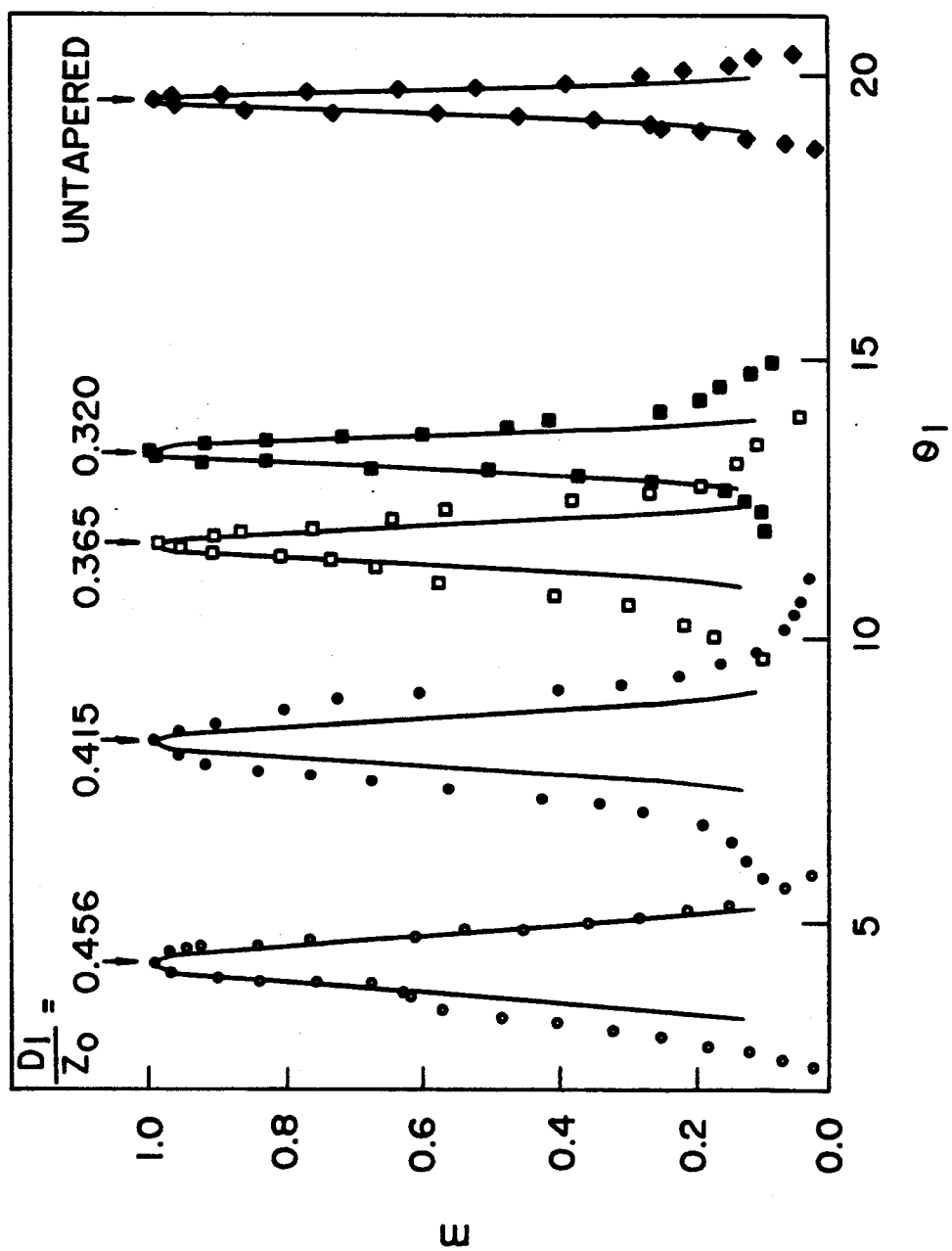
FIG. 18 graphically illustrates the coupling efficiency $\eta$ as a function of incidence angle $\Theta_i$ for the first ZnS sample.
Figure 19:
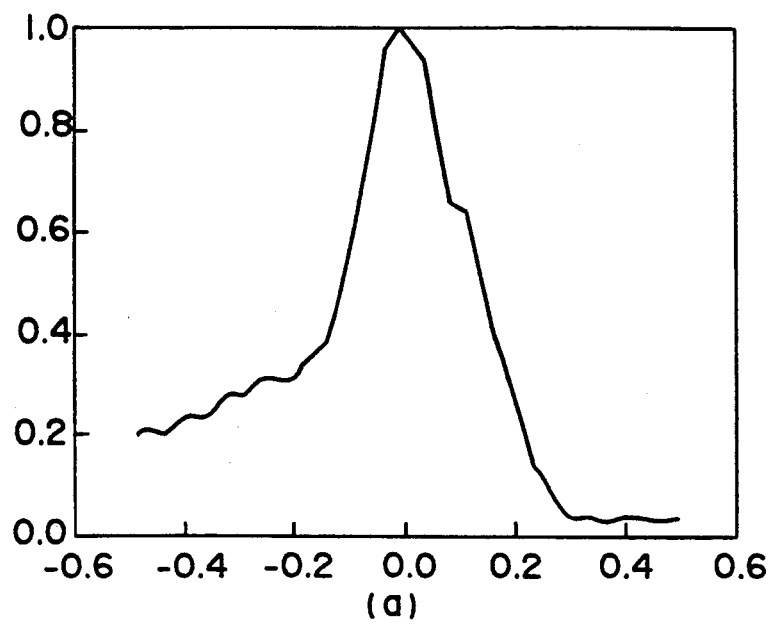
FIG. 19 graphically illustrates the coupling efficiency characteristics of the more sharply tapered ZnS sample of FIG. 18 for the $\eta$ vs. $\Theta_i$ characteristics of the untapered grating.

The efficiency curves of all samples were shifted to lower coupling angles relative to the untapered case as expected from the calculations. The acceptance-broadening by the samples was consistent with the dependence on taper angles predicted by the calculations. The first sample had an equivalent linear taper angle $\alpha$ of $0.007°$. This meant that the angular shift induced by one reflection was $0.014°$, which is much less that the FWHM of the intrinsic mode width of approximately $0.5°$ (FIG. 10). For this reason, the convolution of many $0.5°$ wide efficiency curves centered $0.014°$ apart is essentially continuous. Therefore, the efficiency curves in FIG. 18 are continuously broadened as expected from the ray tracing calculations.

Combining the measured coupling angle, tapered and untapered, with the model results as shown in FIG. 11, allows calculation of the corresponding taper ratios. For the first sample, the four measured points were $13.2°$, $11.6°$, $8.2°$, and $4.1°$, and the untapered coupling angle was $19.5°$. The corresponding taper ratios are calculated to be 0.320, 0.365, 0.415 and 0.456, respectively. Next, the corresponding $\Theta_p$ vs. $\Theta_i$ relationship is used to convert the untapered $\eta$ vs. $\Theta_p$ acceptance curve (FIG. 10) to a predicted acceptance curve for each measurement. These calculated curves are shown in FIG. 18.

The second ZnS sample had an equivalent linear taper angle $\alpha$ of 0.1°. This results in a change in propagation angle within the waveguide of 0.2° for each bounce off the taper. This is equal to the FWHM of the $\eta$ vs. $\Theta_p$ for propagation within the waveguide of approximately 0.2° (see FIG. 19). The resulting efficiency curve is a convolution of 0.2° efficiency curves centered 0.2° apart, and therefore would be expected to oscillate with local maxima at distances $2\alpha$ apart. The distances between local maxima were measured and averaged, with a resulting average value of $2\alpha$ of 0.235°. This agrees with the value $\alpha = 0.1°$ measured by a profilometer.

The coupling angle shift exhibited in the second ZnS sample is near the onset of the substrate mode. The coupling efficiency appears to decrease fully before the onset of the substrate mode and therefore it is likely that the taper ratio is not so large that the substrate mode is interfering. This suggests that the taper ratio is slightly below 0.57.

The coupling shift exhibited by the third sample demonstrates that the effect of coupling with a taper ratio that is larger than the optimum is to couple into the substrate mode even though the propagation angle in the waveguide is far from cutoff. In this sample, the coupling angle is shifted a total of 4°, which is enough in this structure to shift the propagation angle so much that the substrate mode interferes. The efficiency curves of FIGS. 18-21 also indicate that the broadening trends found in other samples were also valid for lower refractive index films.

Wavelength acceptance-broadening is expected to correspond to the angular acceptance-broadening described above. The conversion from angular acceptance to wavelength acceptance is given by $\Delta\lambda = d \cos \Theta_i \Delta\Theta$, where $\Delta\Theta$ is the coupling FWHM change in incidence angle and $\Delta\lambda$ is the coupling FWHM change in wavelength. For the experimental case of FIG. 18, where $D_t/z_0 = 0.456$, $d = 0.36$ $\mu$m, $\Theta_i = 4°$, and $\Delta\Theta = 2°$, the $\Delta\lambda$ expected would be 12.5 nm. This is a high efficiency waveguide coupler suitable for diode lasers that have wavelength instabilities on the order of a few nm. The coupler is also readily fabricated in a single deposition process, and, unlike other grating coupler achromatization solutions, it has no additional components to align.

The ability to increase the angular acceptance of a grating coupler is very useful for many applications in integrated optics. For example, there is less alignment difficulty for grating couplers, and there is broader wavelength acceptance for laser diode applications. In addition, the grating/tapered film coupler has other less obvious possible uses, such as allowing the coupling angle for a given film to be shifted. For example, an optimized taper could have shifted the coupling angle of the first ZnS sample by more than 35°. Therefore, the coupling angle can be shifted without changing the period of the grating or the thickness of the film.

A shift in coupling angle could be useful in preventing interference of a substrate mode in the opposite direction with that for the desired coupled mode. This problem arises in high index films where the coupling angle is so large in the positive direction that it passes the onset of the substrate mode in the opposite direction, thereby decreasing the coupling efficiency and possibly causing other detrimental effects. The problems are avoided by a taper shifting of the coupling angle below that of the reverse substrate mode.

The use of the grating/taper coupler combination in the same geometry as an output coupler results in the ability to spectrally disperse or converge the output beam depending on the taper orientation (similar to broadening or narrowing). The use of the taper to modify the coupler acceptance is not limited to grating couplers; the taper can be used to broaden or narrow the acceptance of a prism coupler in a similar manner.

It can now be appreciated that there has been presented a tapered structure that allows adjustment of the acceptance of a grating coupler over a wide range. The ratio of the transit distance in the taper to the projected taper length, $D_t/z_0$, has been shown to be the parameter for taper optimization. The qualitative taper profile must be taken into account when designing such a coupler, but any shape can be used if properly dimensioned. The taper distance, $z_0$, should be kept long (e.g., $\alpha$ should be kept small) to allow continuous, broadened efficiency curves.

The maximum acceptance-broadening (or narrowing) allowed occurs with higher index films and smaller period gratings. For the experimental sample of ZnS on quartz, the maximum relative broadening is 4.3 times that of an untapered grating structure. For one sample, a coupling FWHM of 2° was demonstrated. This agreed with the broadening predicted by ray tracing calculations. Conversely, the angular acceptance of a coupler can be narrowed by a corresponding amount ($-4.3$ in the above example). The experimental angular acceptance-broadening was equivalent to a wavelength broadening (FWHM) of 12.5 nm. This is a practical method for achromatizing a grating coupler, with minimal alignment or fabrication difficulties.

It can also be appreciated that there has been presented an optical diode laser structure wherein it is easy to use grating couplers, and wherein the difficulties with beam divergence and wavelength instability are eliminated. In the structure mode matching can be achieved and the outcoupled beam can be collimated or imaged clearly.

While the invention has been described with particular reference to a preferred embodiment, it will be understood by those skilled in the art that various changes may be made and equivalents may be substituted for elements of the preferred embodiment without departing from invention. For example, although the taper is thought of as a thickness change, it could also be a refractive index change. In addition, many modifications may be made to adapt a particular situation and material to a teaching of the invention without departing from the essential teachings of the present invention.

While the invention has been described with particular reference to a the combination of a tapered film and a grating coupler results in a hybrid coupler with an increased angular acceptance due to the taper, as well as the high efficiency and easier input beam positioning that are characteristic of the grating coupler. In addition, by positioning the taper differently, it can be used to decrease the acceptance of the coupler for applications where this is required.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A hybrid optical waveguide structure comprising:
   a substrate having a grating formed thereon; and
   a thin-film waveguide film being formed on said substrate and having a tapered profile portion overlaying said grating.

2. The hybrid optical waveguide structure, as set forth in claim 1, wherein said tapered profile portion has a cosine functional relationship.

3. The hybrid optical waveguide structure, as set forth in claim 1, wherein said tapered profile portion has an exponential functional relationship.

4. The hybrid optical waveguide structure, as set forth in claim 1, wherein said structure has a first end portion with a uniform cross section and a second end portion with a tapered cross section, said grating disposed within said second end portion, and wherein said tapered end portion of said waveguide film overlays said grating and decreases in cross section near said second end of said structure.

5. The hybrid optical waveguide structure, as set forth in claim 1, wherein said structure has a first end portion with a uniform cross section and a second end portion with a tapered cross section and with said grating disposed within said second end portion, and wherein said tapered portion of said waveguide film overlays said grating and increases in cross section near said second end portion of said structure.

6. The hybrid optical waveguide structure, as set forth in claim 1, wherein a tapered waveguide film portion angle, a, is an angle of incline or decline of said tapered portion of the waveguide film relative to said grating and substrate.

7. The hybrid optical waveguide structure, as set forth in claim 6, wherein said angle a is positive when a film cross section is decreasing in a region of said grating near an end of said tapered portion of said waveguide film.

8. The hybrid optical waveguide structure, as set forth in claim 6, wherein said angle a is positive when a film cross section is increasing in a region of said grating near an end of the tapered portion of the waveguide film.

9. The hybrid optical waveguide structure, as set forth in claim 6, wherein an effect of angle a on a diffracted beam diffracted at an angle, $Q_d$, relative to a substrate normal is that said diffracted beam is incident at a waveguide film surface at a propagation angle $Q_d + a$ relative to a tapered waveguide film surface normal.

10. The hybrid optical waveguide structure, as set forth in claim 9, wherein said diffracted beam is reflected from said waveguide film surface and a reflected beam is incident at said substrate at a propagation angle of $Q_d + 2a$ relative to said substrate normal.

11. The hybrid optical waveguide structure, as set forth in claim 10, wherein said 2a increase in propagation angle occurs for every reflection from said tapered waveguide film surface.

12. The hybrid optical waveguide structure, as set forth in claim 10, wherein a net result of said reflections from said tapered waveguide film surface is a shift in a propagation angle of 2an, where n is a number of reflections said waveguide film surface.

13. The hybrid optical waveguide structure, as set forth in claim 6, wherein a length of said tapered portion of said waveguide film, $z_0$, is related to said a angle by $$z_0 = \frac{t_f}{\tan(a)}$$

where $t_f$ is a waveguide film thickness.

14. The hybrid optical waveguide structure, as set forth in claim 6, wherein an incident beam is diffracted off said grating at an interface of said waveguide film and said substrate, said diffracted beam undergoes total internal reflection within said tapered portion of said waveguide film, and wherein said tapered portion changes a propagation angle of said diffracted within said waveguide film such that upon leaving said tapered portion, said diffracted beam is traveling at a correct propagation angle for a guided mode.

15. The hybrid optical waveguide structure, as set forth in claim 14, wherein said tapered portion of said waveguide film changes an angular acceptance of said grating by diffracting said incident beam from said grating a number of internal reflections from said waveguide film surfaces, whereby each reflection changes said propagation angle in said waveguide film.

16. The hybrid optical waveguide structure, as set forth in claim 15, wherein said reflections compensate for changes in a propagation angle resulting from changes in an angle of said incident beam.

17. The hybrid optical waveguide structure, as set forth in claim 15, wherein said tapered portion of said waveguide film changes said angular acceptance of said grating by shifting a grating angle of incidence induced by said internal reflections.

18. The hybrid optical waveguide structure, as set forth in claim 17, wherein changing said angular acceptance of said grating by shifting said grating angle of incidence induced by said internal reflections lowers said value of angular dispersion of said grating and reduces change in said diffraction angle due to change in the incidence angle.

19. The hybrid optical waveguide structure, as set forth in claim 1, wherein said waveguide film is an inorganic material.

20. The hybrid optical waveguide structure, as set forth in claim 1, wherein said waveguide film is zinc sulfide.

21. The hybrid optical waveguide structure, as set forth in claim 1, wherein said waveguide film is an organic material.

22. The hybrid optical waveguide structure, as set forth in claim 1, wherein said waveguide film is polycarbonate.

* * * * *